United States Patent [19]

Alt et al.

[11] 4,221,002
[45] Sep. 2, 1980

[54] ELECTRO-OPTICALLY MATRIX-ADDRESSED ELECTROLUMINESCENCE DISPLAY WITH MEMORY

[75] Inventors: Paul M. Alt; Omesh Sahni, both of Yorktown Heights, N.Y.

[73] Assignee: International Business Machines Corporation, Armonk, N.Y.

[21] Appl. No.: 958,228

[22] Filed: Nov. 6, 1978

[51] Int. Cl.$^2$ .................... G11C 13/04; G11C 11/42
[52] U.S. Cl. ................................. 365/111; 365/110; 365/189
[58] Field of Search .................. 365/111, 110, 189

[56] References Cited

U.S. PATENT DOCUMENTS 3,644,741   2/1972   Alt .......................................... 365/111

Primary Examiner—Terrell W. Fears
Attorney, Agent, or Firm—Bernard N. Wiener; Ronald L. Drumheller

[57] ABSTRACT

It has been discovered for the practice of this disclosure that there is a threshold for switching with light an AC coupled electroluminescence (EL) device within the ΔV of the luminance-voltage hysteresis loop thereof. Practice of this disclosure provides hybrid matrix-addressing of an electroluminescence display device with memory through luminance-voltage hysteresis by "ANDING" electrical and optical signals. It has particular utility for a large aspect ratio display, e.g., a single line display, i.e., one for which there is more information content in one direction than in another direction.

7 Claims, 5 Drawing Figures

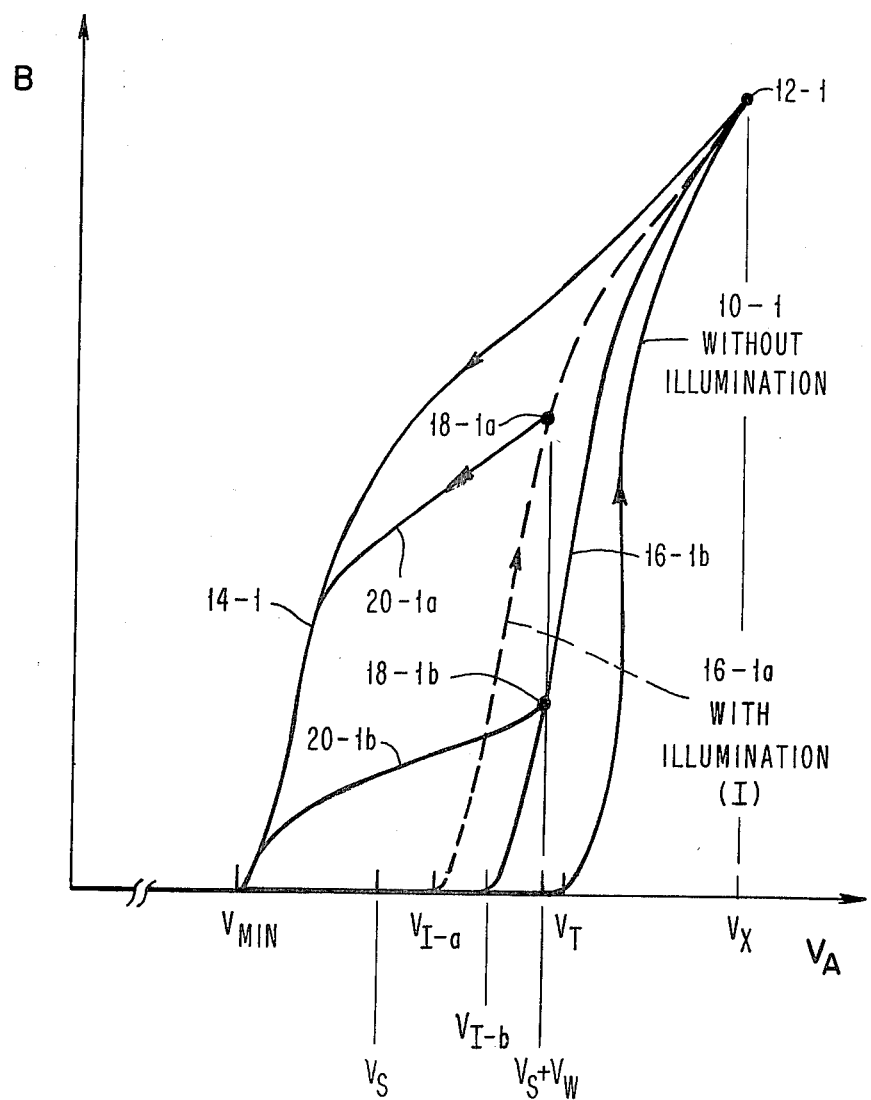

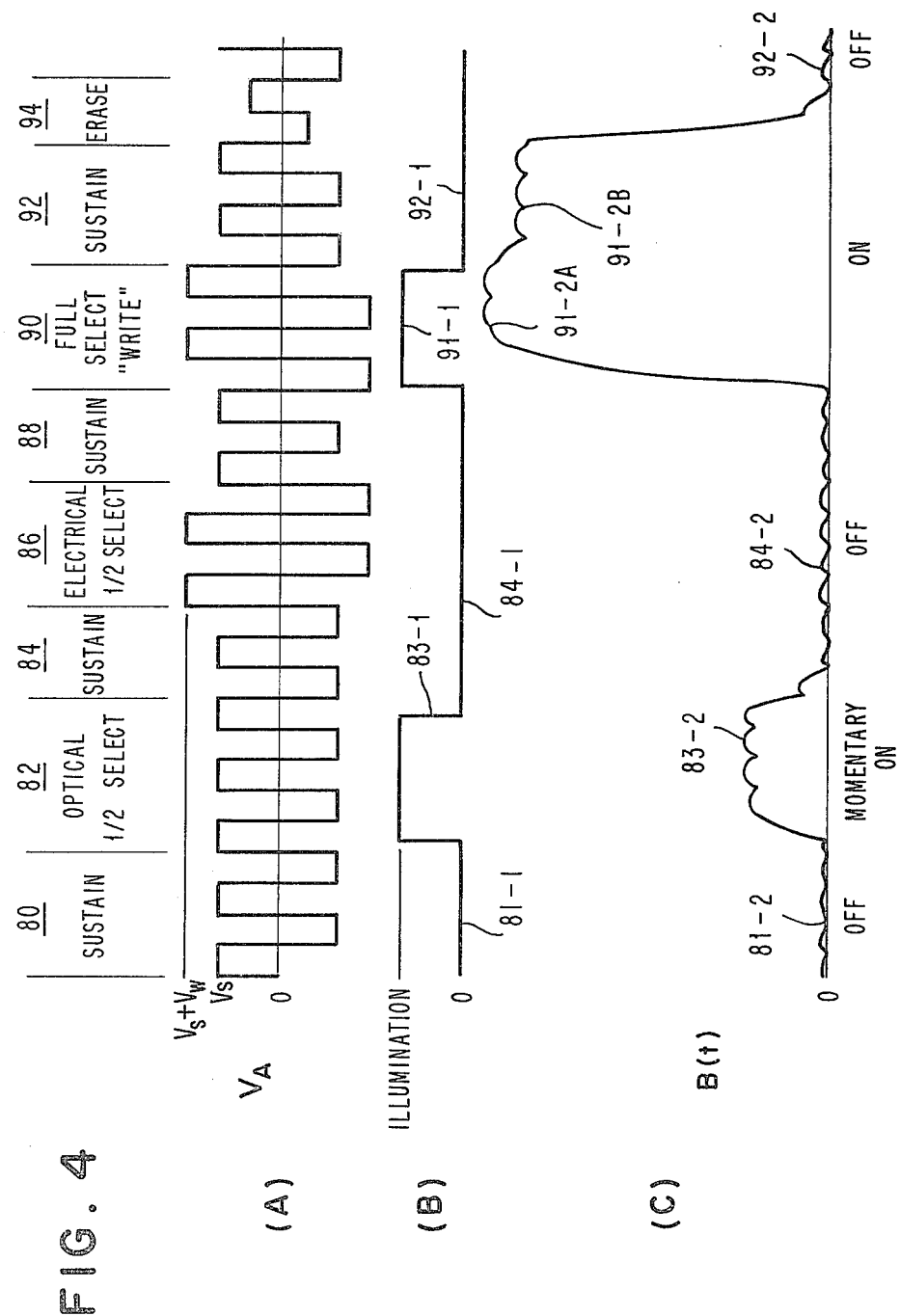

ELECTRO-OPTICALLY MATRIX-ADDRESSED ELECTROLUMINESCENCE DISPLAY WITH MEMORY

BACKGROUND OF THE INVENTION

This invention relates to matrix-addressing of an electroluminescence (EL) storage display panel.

It has been shown that the state of luminance of such devices can be switched: by transient exposure to ultraviolet (UV) radiation, by C. Suzuki et al, Digest 1976 SID Int. Symposium (Society for Information Display, Los Angeles, 1976), p. 50; and by transient exposure to energetic electrons, by W. E. Howard et al, App. Phys. Letts. 31, 399, 1977.

M. Takeda et al, reported in the Journal of Japan Soc. of Applied Phys., Vol. 44 (supplement), 1975, the ZnS: Mn electroluminescence EL devices which exhibit memory (luminance-voltage hysteresis) can be addressed either electrically using matrix selection or optically using 3650 Å illumination.

The modulation and deflection of an ultraviolet beam is relatively expensive. Electrical matrix addressing is not suitable for displays with large aspect ratios, e.g., a display of a single long line of many characters. The large number of drivers required for the long display axis is an undesirable feature of solely electrical matrix addressing.

OBJECTS OF THE INVENTION

It is an object of this invention to achieve matrix addressing of a memory electroluminescence (EL) display device by ANDING electrical and optical write signals.

It is another object of this invention to achieve the practice of the foregoing object by addressing the display via electrical drivers connected to delineated conductive electrode lines and a counter electrode serving the entire display in conjunction with a light source for the other axis of the matrix.

SUMMARY OF THE INVENTION

It has been discovered for the practice of this invention that there is a threshold for switching an electroluminescent device with light within the $\Delta V$ of the hysteresis loop of an electroluminescent material therein which exhibits hysteresis in its luminance-voltage characteristic. An exemplary electroluminescent material with such a characteristic is ZnS: Mn. The materials ZnSe: Mn and ZnS: TbF have also been described as having such a characteristic and therefore would also work for the practice of this invention. This invention provides a hybrid matrix-addressing technology for a memory electroluminescence (EL) display device by "ANDING" electrical and optical write signals. It has especial utility for a large aspect ratio display, e.g., a single line display, i.e., one for which there is more information content in one direction than in another direction.

As an illustrative example of the practice of this invention a display with large aspect ratio, one axis of the display is addressed electrically via electrical drivers connected to delineated conductive electrode lines. The counter electrode is an area electrode serving the entire display. The orthogonal axis of the display is addressed by a slit of light, one pixel wide, and long enough the illuminate the whole column of electrically addressed lines. The slit of light traverses the entire length of the display from end to end. The display is turned on only at the intersections of the rows that receive electrical write signals and the column defined by the slit of light. Modulation of the light is not required because light alone will not write the panel.

DRAWINGS FOR THE INVENTION

FIG. 1 is a schematic graph of luminance vs. voltage showing the luminance-voltage hysteresis characteristic of an AC coupled device with an electroluminescence material and the switching threshold discovery for the practice of the invention with a given illumination intensity.

FIGS. 2A and 2B present graphically data for the practice of this invention concerning ZnS: Mn EL material wherein:

FIG. 4, including A-C shows the operational curves of applied voltage and applied light for matrix-addressing a display in accordance with the principles of this invention and the output luminance from the storage display device accomplished thereby.

PRACTICE OF THE INVENTION

The nature of the discovery for the practice of this invention of a threshold for applied light for switching an electroluminescence (EL) device with light, within the $\Delta V$ of the hysteresis loop of an electroluminescence material for the practice of this invention will be described with reference to the generalized curves of FIG. 1 and with reference to the specialized curves of FIG. 2A for ZnS: Mn EL material.

The hysteresis curve of FIG. 1 shows that for applied voltage above threshold voltage $V_T$, the electroluminescence material produces luminance B along the path 10–1 to a value 12–1 at some voltage $V_x$ above the threshold. On lowering the voltage, the hysteresis curve returns via path 14–1 to a minimum voltage $V_{min}$, at which there is no emitted light from the electroluminescence material.

The dashed curve 16-1a shows the luminance of the device for applied voltage above a switching threshold voltage $V_{I-a}$, when the device is switched "ON" by irradiating it for a certain time t with applied light of intensity I-a. For voltages below the threshold voltage $V_{I-a}$, the applied light radiation does not turn on the device.

Curve 16-1b illustrates the change in the switching characteristic for activation for the same time t, but with a lower light intensity I-b. The voltage threshold $V_{I-b}$ at the lower light intensity I-b is higher than the voltage threshold $V_{I-a}$ for the higher light intensity I-a.

As an illustrative example, consider the device to be biased at a voltage $(V_S + V_W)$ which lies between the voltages $V_{I-a}$ and $V_T$. Irradiation with light of intensity I-a for t sec. will switch "ON" this device to a luminance value 18-1a. After the device is switched on, the applied light is removed and the voltage can be lowered to produce the luminance return path 20-1a of the device. For the lower light intensity I-b, the corresponding "ON" state luminance is 18-1b and the return path is 20-1b.

An electroluminescence device in accordance with the principles of this invention with an hysteresis characteristic comparable to the generalized characteristic shown in FIG. 1 can be switched "ON" to emit luminance by the combined presence of applied light and exemplary applied voltage $V_s+V_w$. Thereafter, it can be sustained by an exemplary voltage at $V_s$ without the requirement for applied light. For light intensity I-a applied for t sec., the operating sustain voltage $V_s$ is restricted within the bounding limits defined by $V_{Min}$ and $V_{I-a}$.

Figure 2A:
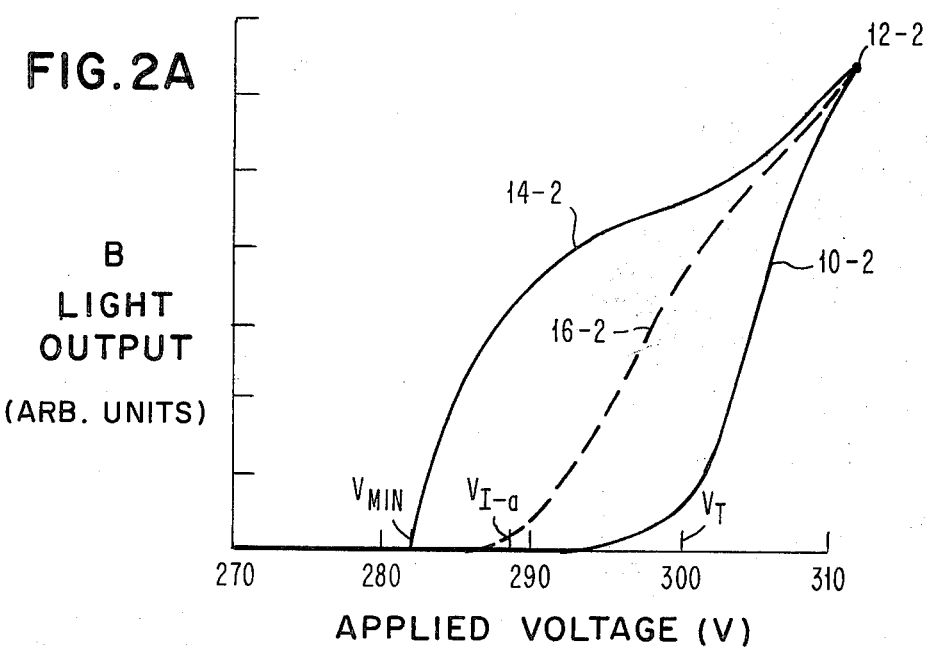
FIG. 2A is a specialized version of FIG. 1 for an experimental device with illumination of 4 milliwatts/cm$^2$ with 8 milliseconds exposure.

The discovery for the practice of this invention exemplified by the generalized curves of FIG. 1, is shown by the specialized curves of FIG. 2A wherein comparable aspects are identically numbered but with suffix number 2 rather than suffix of number 1 as in FIG. 1. The switching data was taken for exposure of 8 millisec. with 4 milliwatts/cm$^2$ of 3650 Å radiation. The switching threshold voltage $V_{I-a}$ is about 290 V. Thus, the device can be biased anywhere between $V_{I-a}$ and $V_T$ in an "OFF" state and can then be turned on by the application of the light pulse I-a.

Figure 2B:
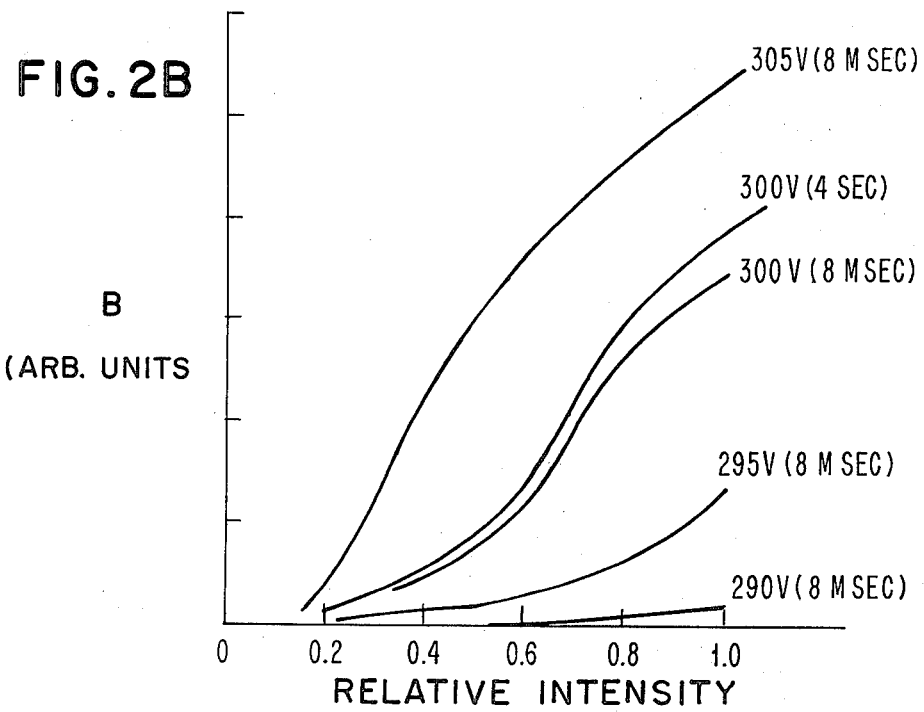
FIG. 2B shows the change in intensity of output luminance plotted against relative intensity of the applied light for various applied voltage levels.

FIG. 2B presents data on the applied illumination versus relative intensity of the luminance output from the electroluminescence device with the exemplary ZnS: Mn electroluminescence material for several fixed applied voltage levels. Essentially, the switching curve 16-2 of FIG. 2A is for relative intensity of the emitted luminance of relative intensity of 1.0 (i.e., 4 MW/cm$^2$) on all voltage curves of FIG. 2B. The duration of the exposures are specified on the individual curves. There are two curves at 300 V which are for data taken at the two different exposure times of 8 msec. and 4 sec. The closeness of the two curves indicates that the switching curve saturates above a certain duration of the light pulse and any further increase in the exposure time does not lead to a brighter "ON" state after switching. The switching curve for 8 msec is saturated which indicates that the same switching characteristics could have been obtained with shorter pulse durations.

Figure 3:
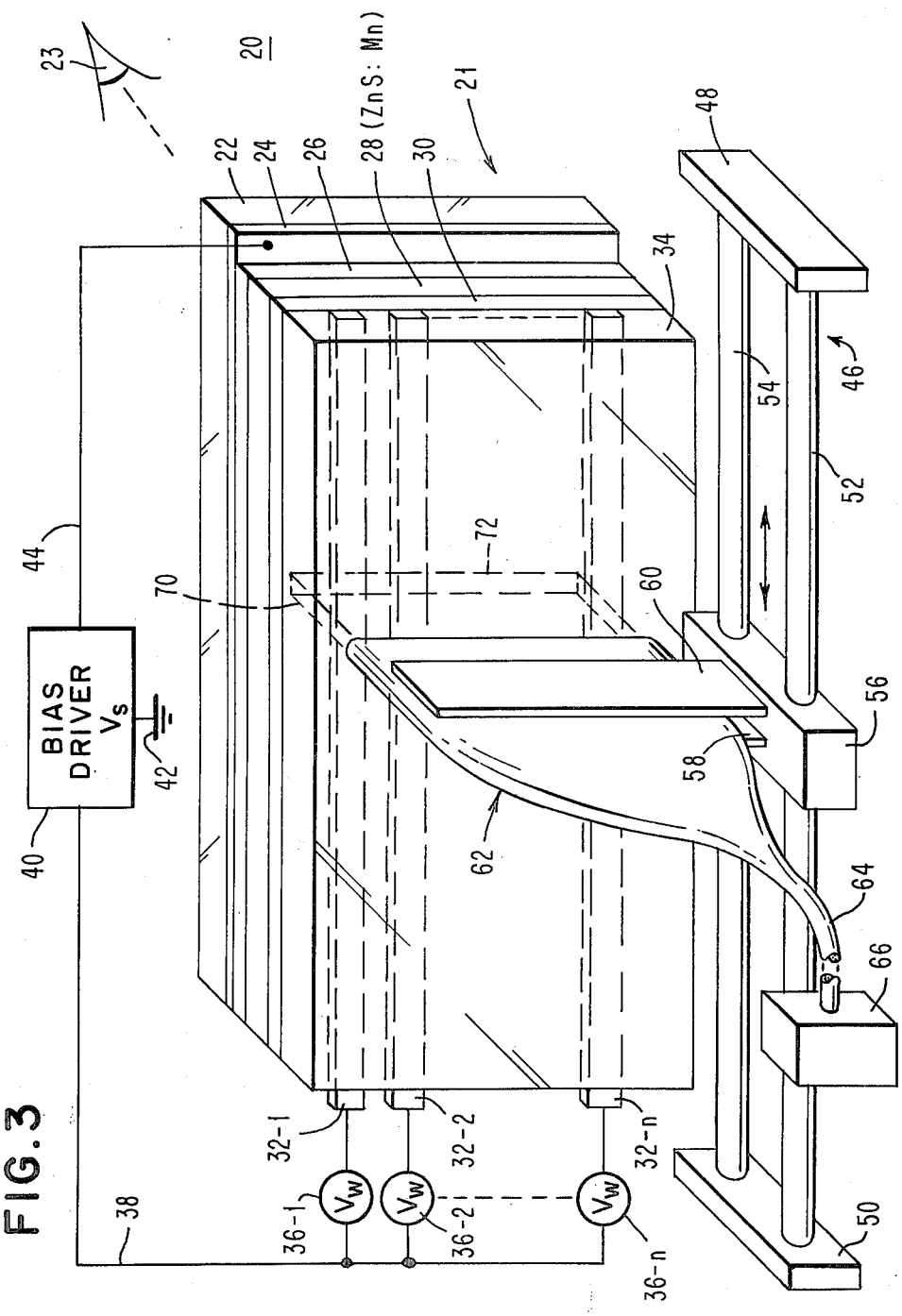
FIG. 3 is a schematic diagram of an exemplary embodiment of this invention shown in perspective.

The embodiment 20 of this invention shown in FIG. 3 comprises the storage section 21 and the optical section 46. In the storage section 21 there is a transparent glass substrate 22 through which the display is observed by human-eye 23. Upon the surface of substrate 22 on the side opposite from the observer eye 23 there is a thin oxide coat 24 which serves as a transparent conductor for establishing the voltage across electroluminescence layer 28 which is ZnS: Mn material. Insulator layer 30 encompasses electroluminescence layer 28 together with insulator layer 26 in a sandwich structure. The row conductors 32-1, 32-2, . . . 32-n are deposited upon insulator layer 30. The conductors 32-1, 32-2, . . . 32-n are tranparent. Finally, the physical structure of display storage unit 21 is completed with a thin film glass layer 34. Although layer 34 is not necessary, when present, it serves as a protective encapsulating layer.

The operational components for the storage display structure 21 include driver units 36-1, 36-2, . . . 36-n connected to the row conductors 32-1, 32-2, . . . 32-n by conductors 34-1, 34-2, . . . 34-n respectively. Bias driver 40 connects to the electrical write driver 36 via conductor 38 and to the transparent area conductor 24 via conductor 44. In operation bias driver 40 produces the high voltage sustain waveform $V_s$ shown in FIG. 4. It is shown as a square wave signal but it could also be a sinusoidal voltage. There is only one high voltage bias driver for the entire display. The electrical half-select write signals $V_w$, indicated in FIG. 4, are produced by the low voltage row driver 36. Since the bias driver and the row drivers are electrically connected in series, the potential applied to a row electrode is the algebraic sum of the potentials supplied by each of these drivers, that is $V_s+V_w$.

The optical addressing unit 46 includes the special components necessary to move the addressing light beam along the row conductors 32. The end pieces 48 and 50 are the framework for the drive mechanism to move the light beam, which for the purpose of operation is considered to be within end pieces 48 and 50. Support members 52 and 54 support in movable fashion the carriage mount 56 and via plates 58 and 60 and the optical fiber bundle 62 which connects to lamp source 66. Thus, a typewriter type carriage produces a light beam 70 from fiber optic bundles 62 as light beam column 72 in focus upon the row conductors 32.

An exemplary operation of the embodiment of FIG. 3 will now be described with regard to the waveforms of FIG. 4. The waveform of FIG. 4A is the resultant voltage applied between the row conductors and the transparent conductor 24 for a given "write" and "erase" cycle. Thus, a voltage $V_s$ is applied to maintain the operation at a sustaining level.

Illustratively, during the sustain period 80, a voltage $V_s$ is applied in the absence of illumination as shown by level 81-1 of FIG. 4B and the essentially zero luminance B(t) level 81-2 of FIG. 4C. Thereafter, during the optical ½ select period 82, a light beam of illumination 83-1 is presented to location 72; and there is a momentary "ON" 83-2 of electroluminescence at location 72, at a low-level of luminance as shown in FIG. 4C. The sustain voltage $V_s$ is continued during period 84 showing a return to the "OFF" luminance state. Thereafter, the voltage level $V_s+V_w$ is applied to obtain electrical ½ select during period 86; and the sustain voltage is continued during period 88. During periods 84, 86 and 88, the applied illumination is zero level 84-1 and the luminance level 84-2 from the panel rows is essentially zero. Thus, a voltage half-select, or an optical half-select, does not permanently alter the EL state of the panel.

The full select is obtained by applying the full select write voltage $V_s+V_w$ during period 90, together with the illumination level 91-1A, which allows the panel to switch to the high luminance state 91-2A. The full select luminance state is maintained by the sustaining voltage $V_s$ during period 92. The derived luminance 91-2B is only slightly lower then luminance level 91-2A when the illumination level 91-1 is applied. Finally, the "erase" is obtained during period 94 by dropping the voltage level on the row conductors to a level below the sustain level $V_S$. During the sustain period 92 and erase period 94, the illumination level 92-1 is zero. The off level 92-2 of the derived EL luminance from the embodiment of FIG. 3 is essentially zero. The off levels 81-2, 84-2 and 92-2 of the derived luminance from the panel is shown to have some finite magnitudes. This is caused by the small but finite EL near but below threshold.

CONSIDERATIONS FOR THE INVENTION

In general, FIG. 3 shows schematically in perspective view an embodiment for practice of this invention of an electroluminescence display. The operation includes half-select by applied voltage and half-select by applied light and utilizes a threshold for light within the $\Delta V$ of the hysteresis loop of B(brightness) vs. V(voltage). An array of electrical conductors applies electric field to specifically delineated volumes of a sheet of an electroluminescence material ZnS: Mn and light applied to a specific location on a selected conductor causes activation of emitted light at that location from the material. FIG. 4 is a timing diagram which relates the intensity and longevity of applied voltage and applied light to the emitted light at selected and non-selected spots of the storage display of FIG. 3.

The electroluminescence display 10 is turned on only at the intersections of rows 32-1, 32-2 that receive electrical write signals and the column 72 defined by light 70 established by a fiber bundle 62 or by a slit (not shown) between the source and the display. Because light alone does not write the panel 20, modulation of the beam of light is not required for operation of an embodiment of this invention.

Illustratively, a relatively low power Hg lamp 66 satisfies the requirement for a steady ultraviolet UV light source of 3650 Å photons. The light intensity required at the display is of the order of milliwatt/cm$^2$ and the dwell time for writing is of the order of a millisecond. An alternative light source (not shown) could be a visible LED (light emitting diode) with a single stripe diffusion (1 pixel wide), or other visible light emitter, e.g., incandescent tungsten, mounted on the carrier and placed adjacent to the display head.

Another suitable example of a light source for the practice of this invention (not shown) is a uniform area UV illuminator, a collimator, and a mechanically moving slit. For example, a tubular light source, along with a paraboloid reflector, can be used as the large area collimated light source. A mechanically moving slit sliding horizontally on the display head can then be used as the optical half-select beam for the column addressing.

A typewriter-like display is schematically represented in FIG. 3. The row half-select information is supplied electrically by the display bias driver 40 plus line information drivers 36-1, 36-2, . . . 36-20. The column half-select information 72 is supplied by the light beam 70 emanating from the flexible fiber optic bundle 62 which mechanically traverses the display 20 from end-to-end. This motion can be provided by the existing carriage mechanism 46 on a typewriter. An alternate scheme (not shown) would be to hold the fiber stationary and have a moving mirror suitably transport the light beam.

It has been discovered experimentally for the practice of this invention that for a given intensity of illumination $I_I$ there is a voltage threshold $V_{PEL}$, i.e., $V_I$, as shown generally in FIG. 1 and specifically in FIG. 2A in the multistable regime of operation of the EL cell. For applied voltage $V_a$ less than $V_{PEL}$, incident illumination will not latch the cell "ON". However, it will produce an enhanced luminance, referred to as photoelectroluminescence (PEL) which rapidly decays when the illumination is removed. For applied voltages $V_T > V_A > V_{PEL}$, the same illumination will write or turn the cell to "ON" condition which will persist on reducing the applied voltage to the sustain level provided that $V_{MIN} < V_A < V_{PEL}$. Thus, a cell can be sustained in any voltage between $V_{MIN}$ and $V_{PEL}$. The electrical half-select situation arises when the applied voltage $V_{Sustain} + V_{Write}$ is raised to a value between $V_{PEL}$ and $V_T$. The device will not switch "ON" as long as the voltage is less than $V_T$ and no applied illumination is present.

ATTRIBUTES OF THE INVENTION

A storage electroluminescent (EL) panel using hybrid matrix addressing is obtained by the practice of the invention, that is, there is electrical addressing along one axis of the panel and there is optical addressing along the orthogonal axis thereof. The only nonlinear layer or element required for practice of this invention is the light producing electroluminescent layer with brightness vs. voltage hystersis curves. For example, there is no requirement for a photoconductor distinct from the electroluminescent layer. The structural requirements for optical addressing are modest because the effect utilized is sensitive and because the light source does not have to be modulated. The sensitivity of the display panel of this invention is a function of wavelength. Light from ultraviolet (UV) to visible can be used in the practice of the invention. However, the intensity of the required applied light increases from UV to visible wavelengths.

The desired display effect from the EL panel of this invention is achieved by adjusting only the amplitude of the electrical signal and the intensity of the writing light. Generally, this is accomplished by selecting the intensity of the writing light such that at the speed of operation of the panel the effective voltage threshold for switching, $V_I(V_{PEL})$, is approximately in the middle of the operational hysteresis loop, that is, about midway between $V_T$ and $V_{MIN}$. Thereafter, the sustain voltage is set to be $V_{MIN} < V_S < V_I$, and the write voltage, $V_W$ is set such that $V_I < (V_S + V_W) < V_T$.

Too much light intensity of the applied switching light will cause portions of the panel which are ½ selected optically to be switched permanently on, and too little intensity of the applied switching light will cause the fully selected portions of the panel to have too little contrast.

Having thus described our invention, what we claim as new, and desire to secure by Letters Patent is:

1. Apparatus for displaying information with storage comprising:
   (a) an electroluminescent layer with hysteresis in its luminance output versus voltage input characteristic and having at least an on-state and an off-state;
   (b) electrical means for applying a sustaining electric field to said electroluminescent layer, said sustaining electric field being insufficient alone for switching said electroluminescent layer to said on-state from said off-state, but being sufficient alone for maintaining in said on-state any portion of said layer which is already in said on-state;
   (c) optical means for applying an input illumination to a first selected portion of said electroluminescent layer, said input illumination being insufficient alone for switching said electroluminescent layer at said illuminated first portion to said on-state from said off-state, said input illumination also being insufficient in combination with said sustaining electric field to switch said illuminated first portion of said electroluminescent layer to said on-state from said off-state; and
   (d) electrical means for superposing an input electric field onto said sustaining electric field over a second selected portion of said electroluminescent layer, said superposed input electric field and sustaining electric field together being insufficient alone for switching said electroluminescent layer at said second selected portion to said on-state from said off-state, (e) at least a part of said first selected portion coinciding with at least a part of said second selected portion, the superposition of said illumination with said sustaining electric field and said input electric field being sufficient all together to switch said electroluminescent layer to said on-state from said off-state wherever said first and second portions coincide.

2. Apparatus as set forth in claim 1 which is a matrix-addressed storage display wherein:

said electrical means for applying a sustaining electric field includes means for applying a bias voltage to a plurality of rows of conductors, said electrical means for superposing an input electric field onto said sustaining electric field includes means for applying additional voltage to a selected row of said conductors; and said optical means includes means for applying a column of illumination across said rows of conductors at any one of a plurality of different locations.

3. Apparatus as set forth in claim 2 wherein said rows of conductors are parallel to each other and said column of illumination is orthogonal thereto at each of said plurality of different locations.

4. Apparatus as set forth in claim 1 wherein said electroluminescent layer is ZnS: Mn.

5. Apparatus for displaying information with an electroluminescent material with storage including an electroluminescent layer row addressable electrically by applying voltage to respective row conductors, and column addressable optically by applying illumination sequentially to respective column locations, said electroluminescent layer having at least one hysteresis path in the luminance output versus applied voltage input comprising:

(1) means for maintaining all said row conductors at a sustaining potential value $V_A = V_S$ where $V_{MIN} < V_S < V_I$, where $V_{MIN}$ = the lowest voltage in the hysteresis regime at which there is emitted light, $V_A$ = the amplitude of the applied voltage, $V_S$ = the sustain voltage amplitude and is a voltage level between $V_I$ and $V_{MIN}$, and $V_I$ = the lowest voltage for which the actual luminance of the electroluminescent material can be switched to a stable on-state with intensity I;

(2) means for applying a selected illumination of intensity I-a such that the threshold $V_{I-a}$ for switching to a stable on-state is within the hysteresis voltage range $V_{MIN} < V_{I-a} < V_T$ where $V_T$ is the threshold for voltage switching in the absence of any illumination, and $V_{MIN}$ is the minimum voltage for light emission in the hysteretic range; and (3) means for applying a write potential $V_W$ which is algebraically added to the sustain voltage $V_S$ such that $V_S + V_W$ is greater than $V_{I-a}$ and less than $V_T$, whereby row conductors receiving said potential will switch to a stable on-state in areas which receive simultaneously light intensity I-a.

6. Method for displaying information with storage with an electroluminescent layer with hysteresis in its luminance output versus voltage input characteristic and having at least an on-state and an off-state, comprising the steps of:

applying a sustaining electric field to the electroluminescent layer, said sustaining electric field being insufficient alone for switching said electroluminescent layer at said location to said on-state from said off-state, but being sufficient alone for maintaining in said on-state any portion of said layer which is already in said on-state;

applying an input illumination to a first selected portion of said electroluminescent layer, said input illumination being insufficient alone for switching said electroluminescent layer at said illuminated first portion to said on-state from said off-state, said input illumination also being insufficient in combination with said sustaining electric field to switch said illuminated first portion of said electroluminescent layer to said on-state from said off-state; and superposing an input electric field onto said sustaining electric field over a second selected portion of said electroluminescent layer, said superposed input electric field and sustaining electric field together being insufficient alone for switching said electroluminescent layer at said second selected portion of said on-state from said off-state, at least a part of said first selected portion coinciding with at least a part of said second selected portion, the superposition of said illumination with said sustaining electric field and said input electric field being sufficient all together to switch said electroluminescent layer to said on-state from said off-state wherever said first and second portions coincide.

7. Method of operating an electroluminescent display with storage including an electroluminescent layer row addressable electrically by applying voltage to respective row conductors, and column addressable optically by applying illumination sequentially to respective column locations, said electroluminescent layer having at least one hysteresis path in the luminance output versus applied voltage input comprising the steps of:

(1) maintaining all said row conductors at a sustaining potential value $V_A = V_S$ where
$V_{MIN} < V_S < V_I$, wherein $V_{MIN}$ = the lowest voltage in the hysteresis regime at which there is emitted light, $V_A$ = the amplitude of the applied voltage, $V_S$ = the sustain voltage amplitude and is a voltage level between $V_I$ and $V_{MIN}$ $V_I$ = the lowest voltage for which the actual luminance of the electroluminescent material can be switched to a stable on state with intensity I;

(2) applying a selected illumination of intensity I-a such that the threshold for switching to a stable on state is within the hysteresis voltage range $V_{MIN} < V_{I-a} < V_T$ where $V_T$ is the threshold for voltage switching in the absence of any illumination, and $V_{MIN}$ is the minimum voltage for light emission in the hysteretic range; and (3) applying a write potential $V_W$ which is algebraically added to the sustain voltage $V_S$ such that $V_S + V_W$ is greater than $V_{I-a}$ and less than $V_T$, whereby row conductors receiving said potentially will switch to a stable on-state in areas which receive simultaneously light intensity I-a.

* * * * *